US012372084B2

(12) United States Patent
Rindahl et al.

(10) Patent No.: US 12,372,084 B2
(45) Date of Patent: Jul. 29, 2025

(54) HYDRAULIC POWER GENERATION PUMP CONTROL

(71) Applicant: ILLINOIS TOOL WORKS INC., Glenview, IL (US)

(72) Inventors: Paul Rindahl, Jordan, MN (US); James Hennen, Plymouth, MN (US); Scott Johnson, Waconia, MN (US); Kurt Kvistberg, Plymouth, MN (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 18/784,464

(22) Filed: Jul. 25, 2024

(65) Prior Publication Data

US 2025/0043779 A1 Feb. 6, 2025

Related U.S. Application Data

(60) Provisional application No. 63/517,180, filed on Aug. 2, 2023.

(51) Int. Cl.

*F04B 49/22* (2006.01)
*F04B 23/06* (2006.01)
(Continued)

(52) U.S. Cl.

CPC .............. *F04B 49/22* (2013.01); *F04B 23/06* (2013.01); *F15B 1/26* (2013.01); *F15B 19/00* (2013.01)

(58) Field of Classification Search

CPC ...... F15B 11/0426; F15B 11/17; F04B 49/22; F04B 49/007

See application file for complete search history.

(56) References Cited

U.S. PATENT DOCUMENTS 5,190,446 A 3/1993 Salter et al.
8,955,397 B2 2/2015 Saari et al.
(Continued)

FOREIGN PATENT DOCUMENTS

EP 0361927 B1 4/1990
GB 750121 A 6/1956
(Continued)

OTHER PUBLICATIONS

"MTS SilentFlo 515 Hydraulic Power Units", MTS Systems Brochure, Mar. 2023, 12 pages.
(Continued)

*Primary Examiner* — Abiy Teka
(74) *Attorney, Agent, or Firm* — Steven M. Koehler; Westman, Champlin & Koehler, P.A.

(57) ABSTRACT

A hydraulic power unit includes a reservoir containing hydraulic fluid, a main output, a pressure sensor, at least one active valve hydraulic pump and at least one passive valve hydraulic pump. A main flow of the hydraulic fluid is discharged through the main output. The pressure sensor includes a pressure signal that is indicative of a pressure of the main flow. Each active valve hydraulic pump is configured to drive a first flow portion of the main flow from the reservoir to the main output when the pressure signal is below a first pressure setpoint. Each passive valve hydraulic pump is configured to drive a second flow portion of the main flow from the reservoir to the main output when the pressure signal is below a second pressure setpoint.

20 Claims, 9 Drawing Sheets

(51) Int. Cl.

| | |
|---|---|
| ***F15B 1/26*** | (2006.01) |
| ***F15B 19/00*** | (2006.01) |

(56) References Cited

U.S. PATENT DOCUMENTS

| | | | | |
|---|---|---|---|---|
| 9,488,163 | B2 | 11/2016 | Caldwell et al. | |
| 2011/0240146 | A1 | 10/2011 | Kawasaki et al. | |
| 2018/0164821 | A1 | 6/2018 | Litz et al. | |
| 2019/0211849 | A1* | 7/2019 | Rampen | F15B 11/0445 |

FOREIGN PATENT DOCUMENTS

| | | | | | |
|---|---|---|---|---|---|
| JP | H1193848 | A | | 4/1999 | |
| RU | 2722059 | C1 | * | 5/2020 | |
| WO | WO-2018169116 | A1 | * | 9/2018 | F15B 13/06 |

OTHER PUBLICATIONS

Search Report in corresponding European Application Serial No. 24192137.8 dated Oct. 29, 2024.

* cited by examiner

HYDRAULIC POWER GENERATION PUMP CONTROL

CROSS REFERENCE TO RELATED APPLICATIONS

This application claims the benefit of priority from U.S. Provisional Patent Application No. 63/517,180 filed Aug. 2, 2023 for "Hydraulic Power Generation Pump Control," the content of which is hereby incorporated by reference.

FIELD

Embodiments of the present disclosure generally relate to hydraulic power generation and, more particularly, to hydraulic power generation using two different types of hydraulic pumps.

BACKGROUND

Dynamic testing systems, such as those developed by MTS Systems Corporation, include testing stations that perform various tests through the application of loads and displacements to a test subject using hydraulic actuators. The testing stations may include, for example, a vehicle testing station that applies simulated driving conditions to a mobile vehicle, or a building testing station that applies simulated seismic activity to a building.

The hydraulic actuators of the testing stations are driven by hydraulic fluid flows that are generated by hydraulic power units. Conventional hydraulic power units include multiple passive valve hydraulic pumps having variable displacements. Such passive valve hydraulic pumps include, for example, hydraulic piston pumps having multiple piston pumps (e.g., piston and cylinder assemblies) having an adjustable working volume for varying the discharged hydraulic fluid flow. Hydraulic fluid flows traveling into and out of the working volumes are controlled using passive (e.g., pressure-actuated) valves. One common type of passive valve hydraulic pump used in hydraulic power units is a variable displacement axial piston pump that utilizes a swash plate to vary the working volume of the piston pumps.

While passive valve hydraulic pumps having variable displacements may be effective at efficiently providing large volumetric hydraulic fluid flows, they are generally unable to quickly respond to changes in fluid flow demands.

SUMMARY

Embodiments of the present disclosure relate to hydraulic power generation for a dynamic testing system and include a hydraulic power unit and methods of operating the hydraulic power unit, a hydraulic power system and methods of operating the hydraulic power system.

One embodiment of a hydraulic power unit (HPU) includes a reservoir containing hydraulic fluid, a main output, a pressure sensor, at least one active valve hydraulic pump and at least one passive valve hydraulic pump. A housing contains the reservoir, the at least one active hydraulic pump and the at least one passive hydraulic pump. A main flow of the hydraulic fluid is discharged through the main output. The pressure sensor includes a pressure signal that is indicative of a pressure of the main flow. Each active valve hydraulic pump is configured to drive a first flow portion of the main flow from the reservoir to the main output when the pressure signal is below a first pressure setpoint. Each passive valve hydraulic pump is configured to drive a second flow portion of the main flow from the reservoir to the main output when the pressure signal is below a second pressure setpoint.

In some embodiments of the HPU, the first pressure setpoint is less than the second pressure setpoint, or the first pressure setpoint is greater than the second pressure setpoint.

In some embodiments of the HPU, the first pressure setpoint is about 1-5% less than the second pressure setpoint.

In some embodiments of the HPU, the first pressure setpoint is about 1-5% greater than the second pressure setpoint.

In some embodiments of the HPU, the first pressure setpoint is equal to the second pressure setpoint.

In some embodiments, the hydraulic power unit includes at least one controller configured to set the first and second pressure setpoints.

In some embodiments of the HPU, the at least one passive valve hydraulic pump comprises a plurality of the passive valve hydraulic pumps.

In some embodiments of the HPU, the at least one active valve hydraulic pump comprises a plurality of the active valve hydraulic pumps.

In some embodiments of the HPU, the at least one active valve hydraulic pump comprises a plurality of the active valve hydraulic pumps.

In some embodiments of the HPU, each active valve hydraulic pump comprises: a low pressure port connected to the fluid reservoir; a high pressure port connected to the main output; a plurality of piston pumps; a motor configured to drive a cyclical change to a working volume of each piston pump; a plurality of active valves, each corresponding to one of the piston pumps and configured to set the piston pump in an activated state, in which the cyclical change to the working volume drives the first flow portion of hydraulic fluid from the working volume through the high pressure port, and a deactivated state, in which a fluid pathway is formed between the working volume and the reservoir or the low pressure port; and a pump controller configured to control each of the active valves to individually set the piston pumps in the activated or the deactivated state.

In some embodiments of the HPU, each passive valve hydraulic pump comprises: a low pressure port connected to the fluid reservoir; a high pressure port connected to the main output; a plurality of piston pumps, each configured to draw hydraulic fluid through the low pressure port into an adjustable working volume, and drive the second flow portion of hydraulic fluid from the adjustable working volume through the high pressure port; and a motor configured to drive a cyclical change to the adjustable working volume of each piston pump.

In one example of a method of operating the hydraulic power unit, a first flow portion of the main flow is driven using one or more of the at least one active valve hydraulic pump when the pressure signal indicates that the pressure of the main flow is below a first pressure setpoint. The at least one active valve hydraulic pump is deactivated when the pressure signal indicates that the pressure of the main flow is above the first pressure setpoint. A second flow portion of the main flow is driven using one or more of the at least one passive valve hydraulic pump when the pressure signal indicates that the pressure of the main flow is below a second pressure setpoint. The at least one passive valve hydraulic pump is deactivated when the pressure signal indicates that the pressure of the main flow is above the second pressure setpoint.

In some embodiments of the method, the first pressure setpoint is less than the second pressure setpoint, or the first pressure setpoint is greater than the second pressure setpoint.

In some embodiments of the method, the first pressure setpoint is about 1-5% less than the second pressure setpoint.

In some embodiments of the method, the first pressure setpoint is about 1-5% greater than the second pressure setpoint.

In some embodiments of the method, the first pressure setpoint is equal to the second pressure setpoint.

In some embodiments of the method, the at least one passive valve hydraulic pump comprises a plurality of the passive valve hydraulic pumps.

In some embodiments of the method, the at least one active valve hydraulic pump comprises a plurality of the active valve hydraulic pumps.

In some embodiments of the method, the at least one active valve hydraulic pump comprises a plurality of the active valve hydraulic pumps.

In some embodiments of the method, each active valve hydraulic pump comprises: a low pressure port connected to the fluid reservoir; a high pressure port connected to the main output; a plurality of first piston pumps; a motor configured to drive a cyclical change to a working volume of each first piston pump; a plurality of active valves, each configured to set one of the first piston pumps in an activated state, in which the cyclical change to the working volume drives a portion of the first flow portion through the high pressure port, and a deactivated state, in which a fluid pathway is formed between the working volume and the reservoir or the low pressure port; and a pump controller configured to control each of the active valves to individually set the first piston pumps in the activated or the deactivated state; and each passive valve hydraulic pump comprises: a low pressure port connected to the fluid reservoir; a high pressure port connected to the main output; a plurality of second piston pumps, each configured to draw hydraulic fluid through the low pressure port into an adjustable working volume, and drive a portion of the second flow portion of hydraulic fluid from the adjustable working volume through the high pressure port; and a motor configured to drive a cyclical change to the adjustable working volume of each of the second piston pumps.

One embodiment of a hydraulic power system includes at least one first hydraulic power unit, at least one second hydraulic power unit and a flow aggregator. Each of the first hydraulic power units includes a first reservoir comprising hydraulic fluid, a first main output through which a first main flow of the hydraulic fluid is discharged, a first pressure sensor having a first pressure signal that is indicative of a first pressure of the first main flow, and at least one active valve hydraulic pump configured to drive a flow portion of the first main flow from the first reservoir to the first main output when the first pressure signal indicates that the first pressure is below a first pressure setpoint. Each second hydraulic power unit includes a second reservoir comprising hydraulic fluid, a second main output through which a second main flow of the hydraulic fluid is discharged, a second pressure sensor having a second pressure signal that is indicative of a second pressure of the second main flow, and at least one passive valve hydraulic pump, each configured to drive a flow portion of the second main flow from the second reservoir to the second main output when the second pressure signal indicates that the second pressure is below a second pressure setpoint. The flow aggregator is configured to combine the first and second main flows into a combined main flow.

In some embodiments of the system, the first pressure setpoint is less than the second pressure setpoint, or the first pressure setpoint is greater than the second pressure setpoint.

In some embodiments of the system, the first pressure setpoint is about 1-5% less than the second pressure setpoint.

In some embodiments of the system, the first pressure setpoint is about 1-5% greater than the second pressure setpoint.

In some embodiments of the system, the first pressure setpoint is equal to the second pressure setpoint.

In some embodiments the system includes at least one controller configured to set the first and second pressure setpoints.

In some embodiments of the system, the at least one passive valve hydraulic pump comprises a plurality of the passive valve hydraulic pumps.

In some embodiments of the system, the at least one active valve hydraulic pump comprises a plurality of the active valve hydraulic pumps.

In some embodiments of the system, the at least one active valve hydraulic pump comprises a plurality of the active valve hydraulic pumps.

In some embodiments of the system, each active valve hydraulic pump comprises: a low pressure port connected to the fluid reservoir; a high pressure port connected to the main output; a plurality of first piston pumps; a motor configured to drive a cyclical change to a working volume of each first piston pump; a plurality of active valves, each configured to set one of the first piston pumps in an activated state, in which the cyclical change to the working volume drives a portion of the first main flow from the working volume through the high pressure port, and a deactivated state, in which a fluid pathway is formed between the working volume and the reservoir or the low pressure port; and a pump controller configured to control each of the active valves to individually set the first piston pumps in the activated or the deactivated state; and each passive valve hydraulic pump comprises: a low pressure port connected to the fluid reservoir; a high pressure port connected to the main output; a plurality of second piston pumps, each configured to draw hydraulic fluid through the low pressure port into an adjustable working volume, and drive a portion of the second main flow from the adjustable working volume through the high pressure port; and a motor configured to drive a cyclical change to the adjustable working volume of each of the second piston pumps.

In some embodiments, one or more pressure sensors described above are each replaced with a flow rate sensor having a flow rate signal that is indicative of a flow rate of the corresponding fluid flow rather than a pressure, and the pumps are controlled based on flow rate signals from the flow rate sensors.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
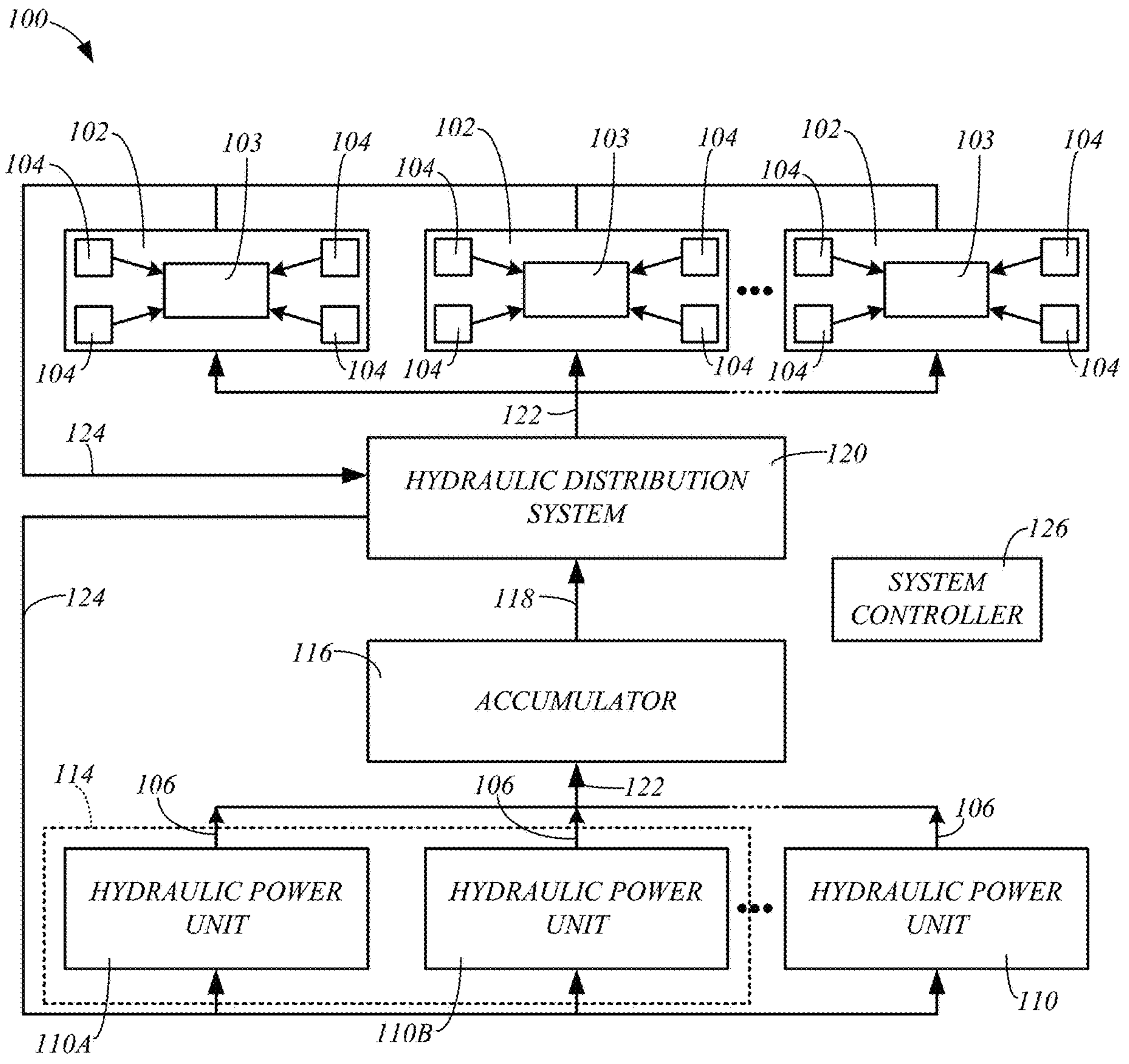
FIG. 1 is a simplified diagram of an example of a dynamic testing system, in accordance with embodiments of the present disclosure.

Embodiments of the present disclosure are described more fully hereinafter with reference to the accompanying drawings. Elements that are identified using the same or similar reference characters refer to the same or similar elements. The various embodiments of the present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art.

FIG. 1 is a simplified diagram of an example of a dynamic testing system 100, in accordance with embodiments of the present disclosure. The testing system 100 may include one or more test stations 102, each of which may be configured to perform a test or conditions simulation through the application of forces and/or displacements to a test subject 103 (e.g., an automobile, a building, etc.) using hydraulic actuators 104.

The hydraulic actuators 104 are driven by flows 106 of hydraulic fluid that are generated by one or more hydraulic power units (HPU's) 110. The combination of the flows 106 may provide the desired flows demanded by the testing stations 102.

The system 100 may also include one or more hydraulic power systems (HPS) 114. Each HPS 114 comprises a combination of two or more of the HPU's 110, such as HPU 110A and HPU 110B. The hydraulic fluid flows 106 output by each of HPU's 110 are controlled to produce a desired combined hydraulic fluid flow, as discussed below.

The system 100 may include an accumulator 116 that stores pressurized hydraulic fluid received from the HPU's 110 and/or the HPS's 114. The accumulator 116 may discharge a hydraulic fluid flow 118 that may be supplied to the test stations 102.

In some embodiments, the system 100 may include a distributor 120 that receives the hydraulic fluid flow from the HPU's 110, the HPS's 114 and/or the accumulator 116, and distributes the flows of the hydraulic fluid to the test stations 102, as indicated by arrows 122. Other arrangements may also be used to form the system 100.

The system 100 may be a closed system, in which the low pressure hydraulic fluid flows 124 used by the test stations 102 are returned, such as through the hydraulic distribution system 120, back to the HPU's 110, for example.

A system controller 126 may operate to control various aspects of the system 100 including functions of the HPU's 110, the HPS's 114, valving (e.g., valving of the accumulator and/or distributor) and/or other aspects of the system 100 to supply the test stations 102 with the demanded hydraulic fluid flows 122.

Figure 2:
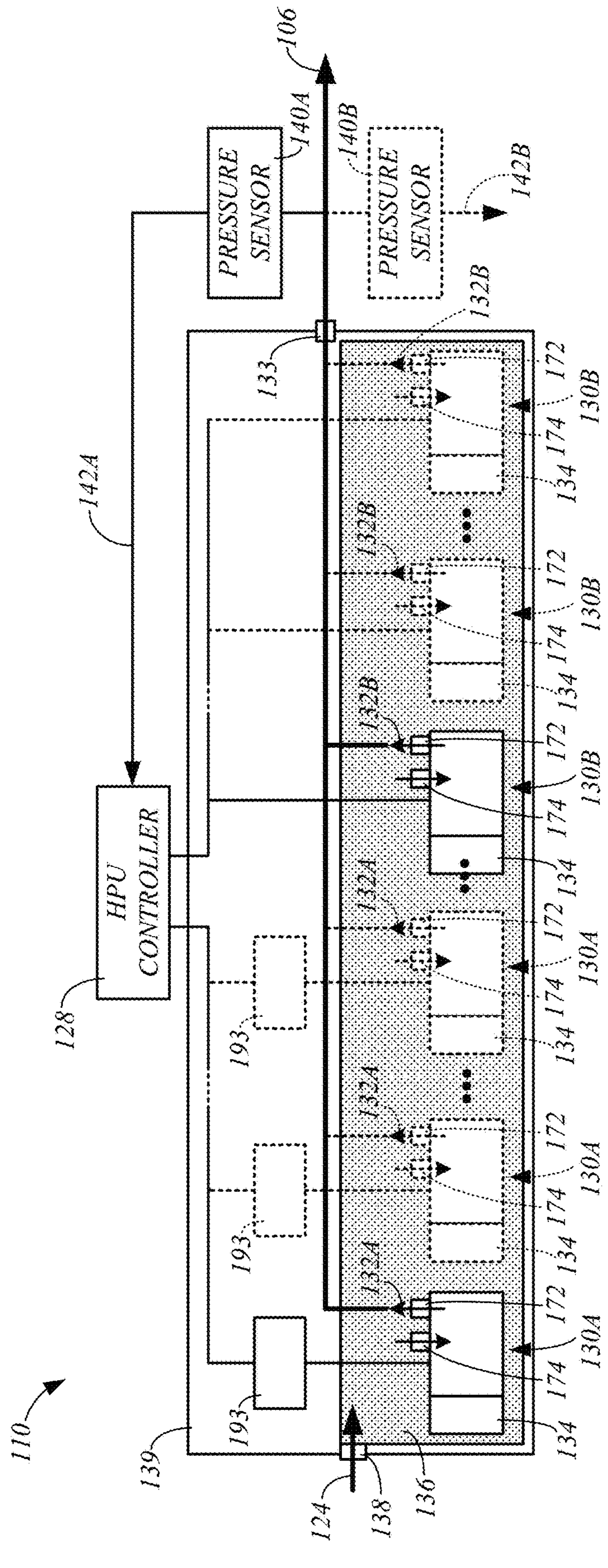
FIG. 2 is a simplified diagram of an example of a hydraulic power unit, in accordance with embodiments of the present disclosure.

FIG. 2 is a simplified diagram of an example of an HPU 110, in accordance with embodiments of the present disclosure. In some embodiments, each HPU 110 is configured to generate a main hydraulic fluid flow 106, which may have a flow rate of 50 or more gallons per minute, such as up to around 200 gallons per minute or more, for example.

Each HPU 110 may include an HPU controller 128 that controls the operation of the HPU 110 to produce the desired hydraulic fluid flow 106. In some embodiments, the HPU 110 includes two or more pumps 130, each of which is configured to drive a flow 132 of hydraulic fluid that forms at least a portion of the main flow 106, which is discharged through a main output 133. Each of the pumps 130 may take the form of a variable displacement hydraulic pump, such as an axial piston pump, a radial piston pump, a bent axis piston pump, a rotary vane pump, and/or other types of variable displacement hydraulic pumps that are suitable for use in the system 100, for example.

Each pump 130 includes an electric motor 134 for driving the pump 130, such as through a suitable gear arrangement. The motors 134 may be 45 kilowatt or 60 horsepower motors, for example. A cooling system (not shown) may be employed by the HPU 110 to cool the motors 134 and other components of the HPU 110.

In one embodiment, the pumps 130 of one or more of the HPU's 110 of the system 100 include one or more first pumps 130A of a first type and one or more second pumps 130B of a second type, which is different from the first type. For example, the HPU 110 may include 1-5 pumps 130A and 1-5 pumps 130B, such as 1-2 pumps 130A and 2-5 pumps 130B. As discussed below, the pumps 130A and 130B may each have capabilities that complement the other to provide improved performance over conventional HPU's 110 that utilize a single type of pump.

In one embodiment, each of the pumps 130A is an active valve hydraulic pump having a variable displacement, and each of the pumps 130B is a passive valve hydraulic pump having a variable displacement. Examples of the pumps 130A and 130B are described below in greater detail.

In some embodiments, the system 100 may include one or more HPU's 110 having only the pumps 130A and/or one or more HPU's 110 having only the pumps 130B. The system 100 may also utilize one or more HPS's 114 that include a combination of at least one HPU 110 having the pumps 130A and at least one HPU 110 having only the pumps 130B, as discussed below.

In some embodiments, the HPU 110 includes a reservoir 136 of hydraulic fluid, in which each of the pumps 130 may be submersed, as indicated in FIG. 2. The low pressure hydraulic fluid 124 may be returned to the reservoir 136 through a return port 138. Alternatively, the pumps 130 may be located externally to the hydraulic fluid of the reservoir 136 and use, for example, super chargers to draw hydraulic fluid from the reservoir 136.

A housing 139 may enclose the reservoir 136 and the pumps 130, as indicated in FIG. 2.

In some embodiments, each HPU 110 includes a pressure sensor 140 (FIG. 2) that is configured to sense the pressure of the hydraulic fluid flow 106 at the main output 133 and generate a pressure signal 142 that is indicative of the sensed pressure. The pressure signal 142 may be used to control the pumps 130 of the HPU 110.

In some embodiments, each HPU includes redundant pressure sensors 140, such as sensors 140A and 140B that respectively generate pressure signals 142A and 142B that are indicative of the pressure of the main flow 106. The redundant pressure signals 142A and 142B may be used to ensure continued operation of the HPU 110 in the event one of the pressure sensors 140 fails. Additionally, the pressure signals 142 generated by the redundant pressure sensors 140 may be used to detect an abnormality, as discussed below.

Figure 3:
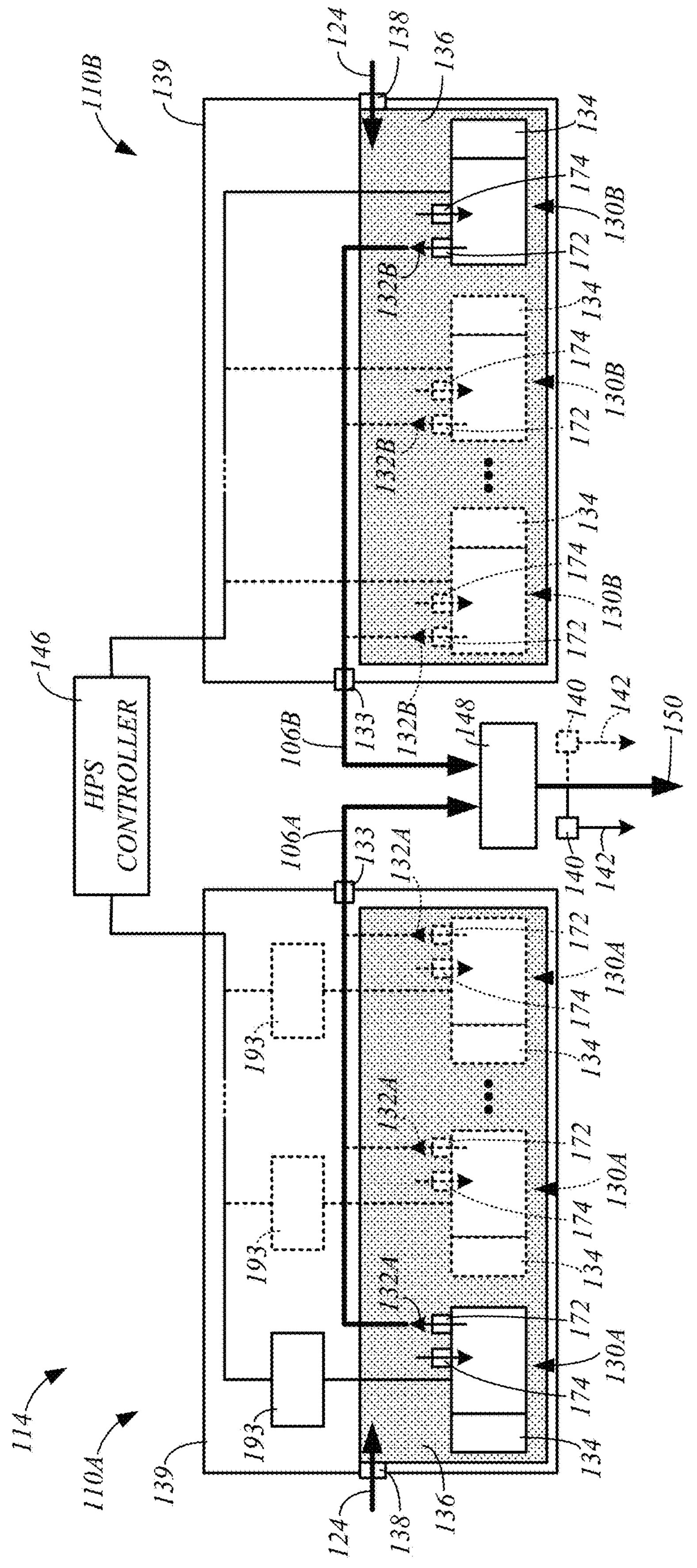
FIG. 3 is a simplified diagram of an example of a hydraulic power system, in accordance with embodiments of the present disclosure.

FIG. 3 is a simplified diagram of an example of an HPS 114, in accordance with embodiments of the present disclosure. As mentioned above, each HPS 114 comprises two or more of the HPU's 110 that are each formed in accordance with embodiments described herein. Thus, while the example HPS 114 of FIG. 3 illustrates the combination of two HPU's 110A and 110B, it is understood that an HPS 114 may include three or more HPU's 110.

The HPU's 110 may be controlled by at least one controller, such as the system controller 126, the HPU controllers 128, and/or an HPS controller 146, to produce main flows 106 (e.g., flows 106A and 106B) that are combined by a flow aggregator 148 to produce a desired combined main flow 150 that is used to meet at least a portion of the hydraulic fluid flow demands of the test stations 102 (FIG. 1).

In some embodiments, the HPS 114 comprises an HPU 110A having one or more pumps 130A of the first type, and an HPU 110B having only pumps 130B of the second type. This allows the HPS 114 to take advantage of the benefits of each type of pump in the generation of the combined main flow 150.

The HPS 114 may utilize one or more of the pressure sensors 140 to measure a pressure of the combined main flow 150 discharged through the aggregator 148, as indicated in FIG. 3. In one example, the pressure sensors 140 may take the form of the one or more pressure sensors 140 of each HPU 110, that measure the pressure at the corresponding main output 133. Alternatively, the HPS 114 may include one or more pressure sensors 140 downstream of the main outputs, such as at the output of the aggregator 148, for example, as indicated in FIG. 3.

In some embodiments, each of the pumps 130B is in the form of a passive valve variable displacement hydraulic pump (e.g., variable displacement analog pump) having an adjustable working volume, such as those used in conventional HPU's of dynamic testing systems. These may include conventional variable displacement radial pumps, variable displacement vane pumps, variable displacement axial pumps, or another suitable conventional variable displacement pump.

Figure 4:
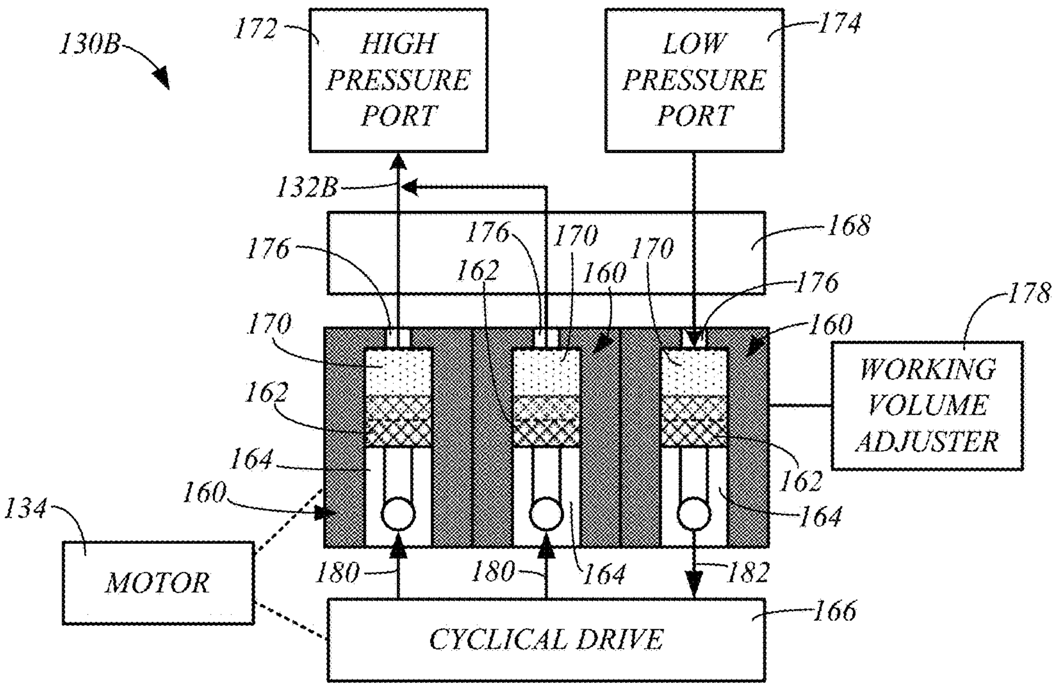
FIG. 4 is a simplified diagram of an example of a passive valve hydraulic pump, in accordance with embodiments of the present disclosure.

FIG. 4 is a simplified diagram of an example of the pump 130B, in accordance with embodiments of the present disclosure. The pump 130B may include a plurality of piston pumps 160, each comprising a piston 162 contained within a cylinder 164. Each piston 162 is driven within its cylinder 164 in a cyclical or reciprocating manner by a cyclical drive 166 using the motor 134. The motor 134 drives relative movement between the cyclical drive 166 and the piston pumps 160, as with conventional variable displacement hydraulic pumps.

Valving 168 connects a working volume 170 of each piston pump 160 to a high pressure port 172 that is connected to the main output 133 and a low pressure port 174 that is connected to the reservoir 136. The working volume 170 of each piston pump 160 is the maximum volume of hydraulic fluid that may be pulled into or expelled from the cylinder 164 through its port 176 during a stroke cycle of the piston 162.

The pump 130B includes a conventional working volume adjuster 178 that operates to adjust the working volume 170 of each of the piston pumps 160 in a conventional manner. This allows the pump 130B to be transitioned from a zero or near zero displacement mode (e.g., idle mode), in which the pump 130B drives little, if any, hydraulic fluid flow 132B through the high pressure port 172, to a maximum displacement mode, in which the pump 130B drives a maximum hydraulic fluid flow 132B through the high pressure port 172, while the motor 134 is driving relative movement between the piston pumps 160 and the cyclical drive 166.

The valving 168 may be conventional valving comprising passive valves, such as poppet check valves, for example, that allow hydraulic fluid to flow into and out of a working volume 170 of each piston pump 160 depending on the movement of the piston 162. For example, when the cyclical drive 166 moves a piston 160 toward its port 176, as indicated by arrows 180, a flow of hydraulic fluid is driven through the port 176. The valving 168 allows the flow to be delivered to the high pressure port 172 while blocking the flow from being delivered to the low pressure port 174, as indicated in FIG. 4. When the cyclical drive 166 moves a piston 162 away from its port 176, such as indicated by arrow 182, a flow of hydraulic fluid is drawn from the reservoir 136 through the low pressure port 174 and the port 176 and into the cylinder 164. Thus, in this manner, the cyclical movement of the pistons 162 can drive the flows 132B of hydraulic fluid received from the reservoir 136 through the high pressure port 172 and to the main output 133 to form the main flow 106, as shown in FIG. 2.

The cyclical drive 166 and the working volume adjuster 178 may take on any suitable form. When the pump 130B is in the form of a conventional variable displacement radial pump, the cyclical drive 166 may take the form of a cam, and the working volume adjuster 178 may adjust an eccentricity of an axis of rotation of the piston pumps 160 relative to the cam or an axis of rotation of the cam relative to the piston pumps 160 to adjust the working volumes, for example. When the pump 130B takes the form of a conventional variable displacement vane pump, the cyclical drive 166 may take the form of a cam ring that engages vanes of the pistons 162 while the piston pumps 160 are rotated relative to the cam ring. Here, the working volume adjuster 178 may take the form of an eccentricity of the axis of rotation of the piston pumps 160 relative to the cam ring, for example.

Figure 5:
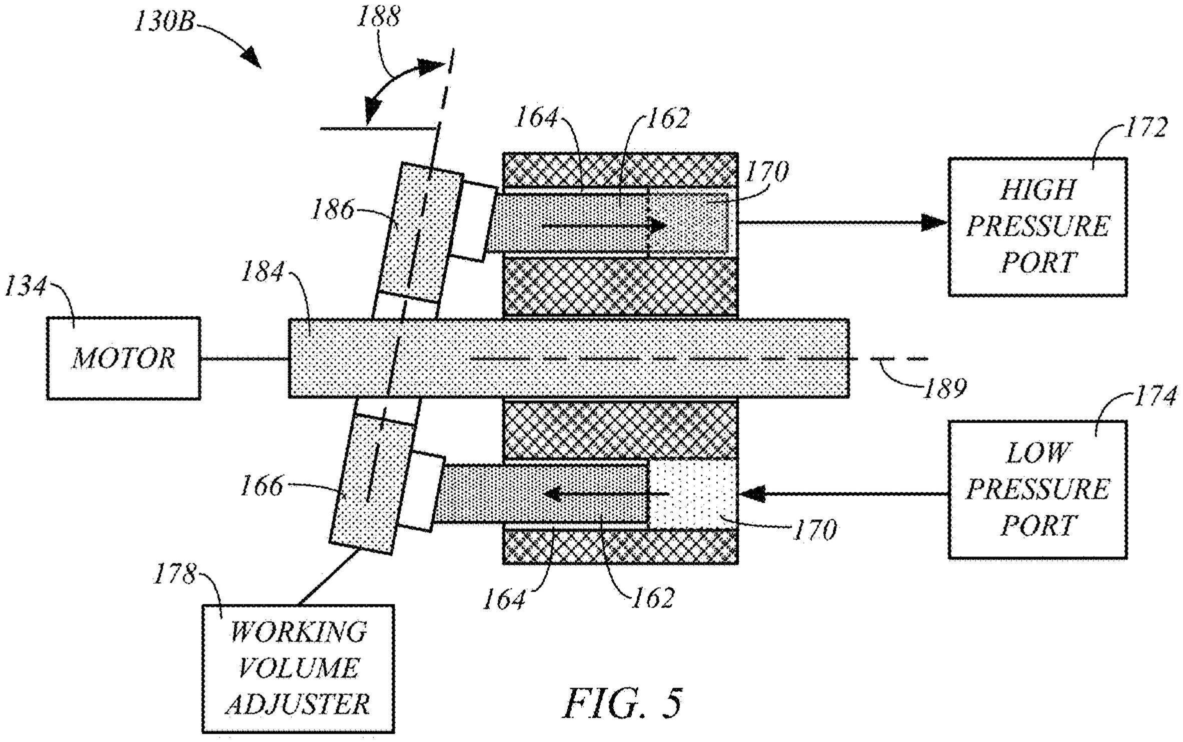
FIG. 5 is a simplified side cross-sectional view of an example of a variable displacement axial pump, in accordance with embodiments of the present disclosure.

The pump 130B may also take the form of a conventional variable displacement axial pump, a simplified side cross-sectional view of an example of which is provided in FIG. 5. Here, the motor 134 may rotate a shaft 184 to which the piston pumps 160 are attached relative to a swash plate 186 that operates as the cyclical drive 166. The swash plate 186 drives the cyclical motion of the pistons 162 to either draw hydraulic fluid into or drive hydraulic fluid from the working volumes 170 of the piston pumps 160 in response to the movement of the piston pumps 160 relative to the swash plate 186. The angle 188 of the swash plate 186 relative to the axis 189 of the shaft 184 determines the working volume 170 of each of the piston pumps 160. The working volume adjuster 178 can adjust the angle 188 from 90 degrees, in which the pump 130B is in its idle mode, to an angle 188 that maximizes the working volumes 170 of the piston pumps, for example.

Figure 6:
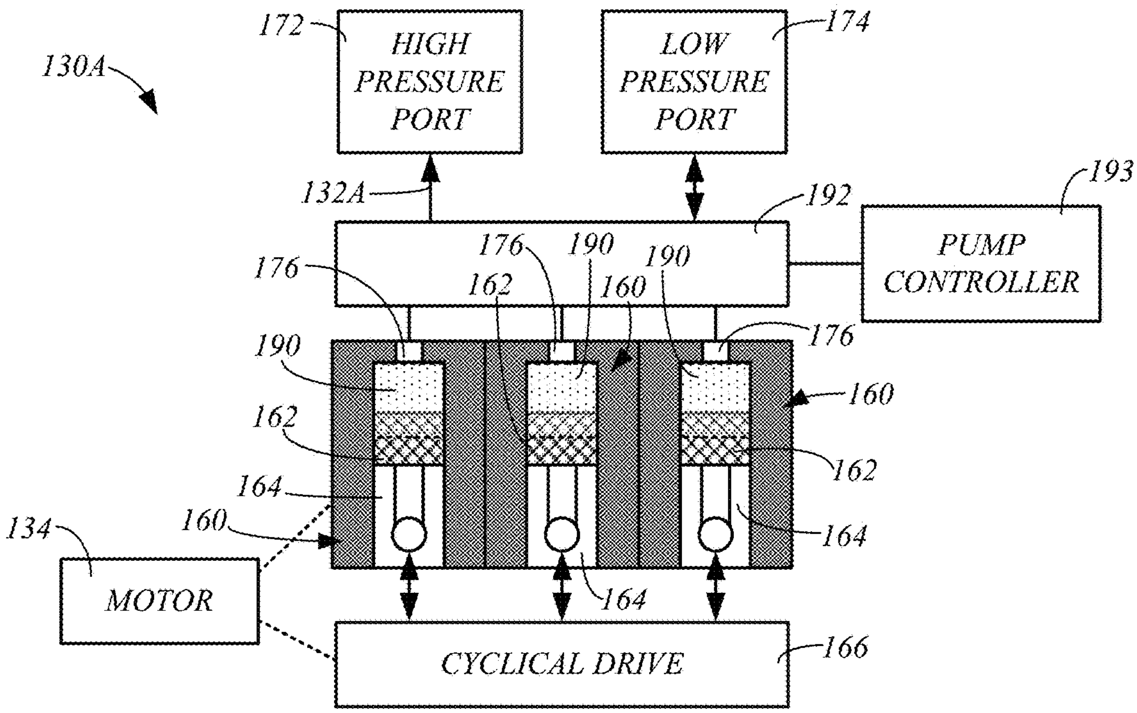
FIG. 6 is a simplified diagram of an example of an active valve hydraulic pump, in accordance with embodiments of the present disclosure.

FIG. 6 is a simplified diagram of an active valve hydraulic pump 130A, in accordance with embodiments of the present disclosure. In some embodiments, the pump 130A is in the form of a conventional active valve variable displacement hydraulic pump, which is commonly referred to as a synthetically commutated hydraulic pump or a digital displacement hydraulic pump. Some aspects of the pump 130A are similar to the pump 130B and are labeled similarly. Thus, the cyclical drive 166 and the piston pumps 160 of the pump 130A may be similar to those of the pump 130B. Additionally, the pump 130A may take the form of a variable displacement radial pump, a variable displacement vane pump, or a variable displacement axial pump, such as that disclosed in U.S. Pat. No. 5,190,446.

The pump 130A may have a fixed working volume 190. As a result, the pump 130A lacks the working volume adjuster 178 of the pump 130B. Instead, the variable displacement of flow of hydraulic fluid 132A that is produced by the pump 130A is controlled through the control of active valving 192 by a pump controller 193.

Figures 7A, 7B, 7C:
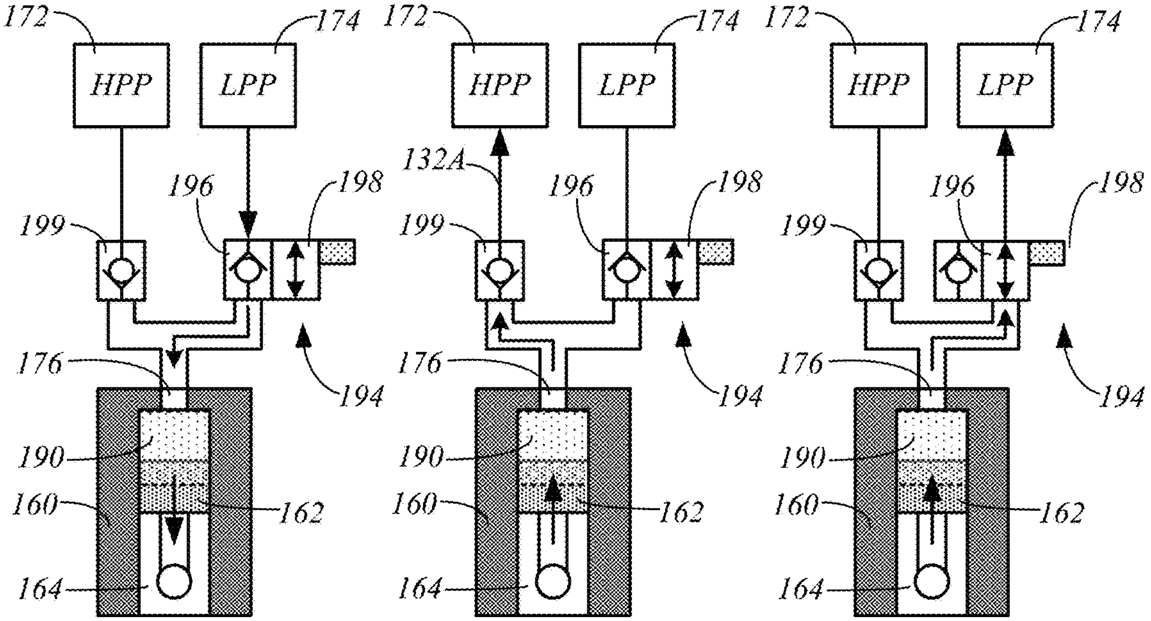
FIGS. 7A-C are simplified drawings illustrating different operational modes of one of a piston pump of the active valve hydraulic pump of FIG. 6, in accordance with embodiments of the present disclosure.

FIGS. 7A-C are simplified drawings illustrating different operational modes of one of the piston pumps 160 of the pump 130A that are made possible by the active valving 192. The active valving 192 may include a solenoid operated poppet valve 194 for each piston pump 160 having a first state in which a poppet valve 196 is in line with the port 176 of the piston pump 160 and blocks flows of hydraulic fluid from the working volume 190 to the low pressure port 174, as illustrated in FIG. 7A. The valve 194 also includes a second state, in which a flow pathway 198 is open between the port 176 of the piston pump 160 and the low pressure port 174, as illustrated in FIG. 7C. The second state of the valve 194 is typically its default (non-energized) state. The active valving 192 may also include a passive valve 199 (e.g., poppet check valve) that allows for a flow of hydraulic fluid from the port 176 of the piston pump 160 to the high pressure port 172 when a pressure threshold is achieved, as indicated in FIG. 7B.

When the valve 194 is in the first state and the cyclical drive 166 moves the piston 162 away from the port 176, hydraulic fluid is drawn from the reservoir 136 through the low pressure port 174 and into the working volume 190 of the piston pump 160, as indicated in FIG. 7A. When the valve 194 is in the first state and the cyclical drive 166 moves the piston 162 toward the port 176, hydraulic fluid is driven from the working volume 190 through the port 176. Since the poppet valve 196 is positioned to block the fluid flow from traveling to the low pressure port 174, the movement of the piston 162 pressurizes the hydraulic fluid and opens the passive valve 199 to allow the hydraulic fluid flow to travel to the high pressure port 172, as indicated in FIG. 7B. As a result, when the active valve 194 is in the first state, the piston pumps 160 of the pump 130A operate in a similar manner as the piston pumps 160 of the pump 130B (FIG. 4).

When the valve 194 is in the second state, the fluid pathway 198 is open between the low pressure port 174 and the port 176 of the piston pump 160, as shown in FIG. 7C. Movement of the piston 162 toward the port 176 driven by the cyclical drive 166 causes hydraulic fluid to be discharged from the working volume 190. Since the discharged hydraulic fluid is not sufficiently pressurized to overcome the threshold pressure of the passive valve 199, the hydraulic fluid travels to the low pressure port 174 through the fluid pathway 198. Likewise, hydraulic fluid may be drawn into the working volume 190 from the low pressure port 174 through the fluid pathway 198 as the piston 162 moves away from the port 176 by the cyclical drive 166. Thus, when the active valve 194 is in the second state, the pump 130A may be in an idle state in which the pump 130A does not drive a flow 132A of hydraulic fluid to the main output 133, while the motor 134 drives relative movement between the piston pumps 160 and the cyclical drive 166.

Accordingly, the flow 132A of hydraulic fluid discharged by the pump 130A to the main port 133 may be controlled based on the number of the piston pumps 160 that are "activated" through the setting of the active valve 194 in the first state, and the timing of the activation of the piston pumps 160, as understood by those skilled in the art.

Figure 8:
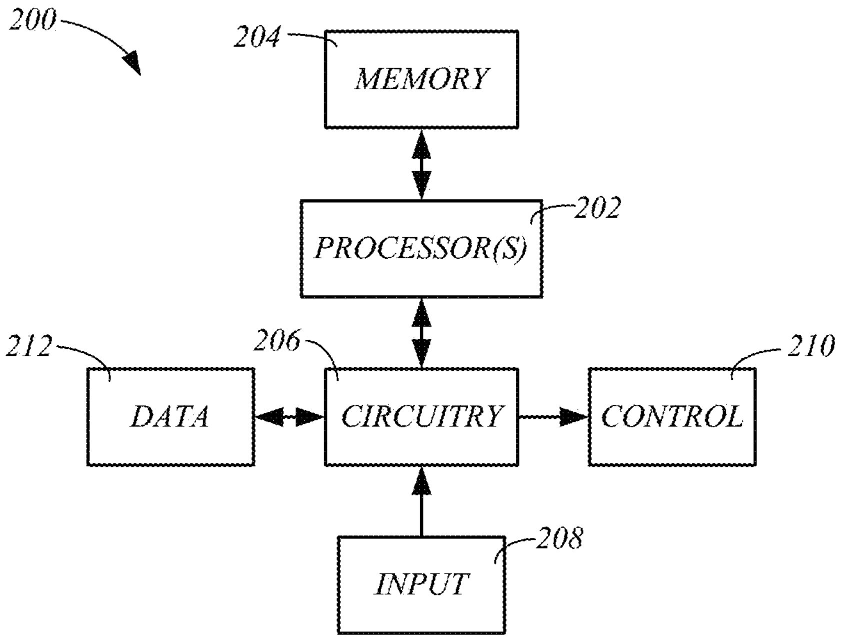
FIG. 8 is a simplified diagram of a controller, in accordance with embodiments of the present disclosure.

The controllers of the system, such as the system controller 126, the HPU controller 128, the HPS controller 146 and the pump controller 193, may take on any suitable form to control the various functions described herein, such as that of the example controller 200 shown in the simplified diagram of FIG. 8. The controller 200 may include one or more processors 202 and memory 204. The one or more processors 202 are configured to perform various functions described herein in response to the execution of instructions contained in the memory 204.

The one or more processors 202 may be components of one or more computer-based systems, and may include one or more control circuits, microprocessor-based engine control systems, and/or one or more programmable hardware components, such as a field programmable gate array (FPGA). The memory 204 represents local and/or remote memory or computer readable media. Such memory 204 comprises any suitable patent subject matter eligible computer readable media and does not include transitory waves or signals. Examples of the memory 204 include conventional data storage devices, such as hard disks, CD-ROMs, optical storage devices, magnetic storage devices and/or other suitable data storage devices. The controller 200 may include circuitry 206 for use by the one or more processors 202 to receive input signals 208 (e.g., sensor signals 100), issue control signals 210 (e.g., signals for controlling the pumps, signals for actuating the active valving, etc.) and/or communicate data 212, such as in response to the execution of the instructions stored in the memory 204 by the one or more processors 202.

Some embodiments of the present disclosure are directed to the operation of the HPU 110 having a combination of the pumps 130A and 130B, in which each type of pumps 130 may be utilized based on its particular attributes to provide improved responsiveness to changing demands for flows of hydraulic fluid by the test stations 102 while efficiently supplying a demanded flow of hydraulic fluid. In general, the active valve hydraulic pumps 130A have the ability to adjust their output flows 132A of hydraulic fluid much quicker than the passive valve hydraulic pumps 130B. For example, the pumps 130A can adjust the output flows 132A of the hydraulic fluid by adjusting the number of activated piston pumps 160 through a control of the states of the active valves 194, as well as the timing of the activations. However, the pumps 130B must use the working volume adjuster 178 to adjust their output flows 132B of the hydraulic fluid. This takes a considerably longer time to make a given change in the output flows 132B relative to the time required to make a similar change to the output flows 132A by the pumps 130A. For example, the pumps 130A may have a response time (e.g., 50 milliseconds) that is about ten times faster than the response time (e.g., 2-4 seconds) of the pumps 130B.

The passive valve hydraulic pumps 130B generally suffer higher heat loss and have lower volumetric energy efficiency when operating at idle over the pumps 130A. However, the pumps 130B have a high volumetric efficiency when operating at about 70% or more of their outlet flow capacity at pressure.

In some embodiments of the present disclosure, the passive valve hydraulic pumps 130B are generally used to provide flows 132B that fulfill the bulk of the demanded (e.g., steady state) hydraulic flow 106 at the main output 133, while the active valve hydraulic pumps 130A are used to quickly provide needed flows 132A of hydraulic fluid to meet an increase or decrease in the demanded flow 106. Thus, the combined use of the pumps 130A and 130B allows the HPU 110 to efficiently meet the bulk of a flow demand, such as during steady state conditions, using the pumps 130B, while providing much faster response to changing flow demands over conventional HPU's through the use of the pumps 130A.

When a test performed by one or more of the test stations 102 demands an increase in the flow 106 of hydraulic fluid, the pressure at the main output 133 drops. Likewise, a decrease in the flow 106 demanded by the test stations 102 causes an increase in the pressure at the main output 133. These pressure changes are detected by, for example, the HPU controller 128 using the pressure signal 142 from the sensor 140. Thus, the output flows 132A and 132B from pumps 130A and 130B may be controlled based on the pressure sensed at the main output 133.

In some embodiments, one or more of the active valve hydraulic pumps 130A are activated to generate the corresponding flows 132A when the pressure indicated by the pressure signal 142 drops below a first pressure setpoint, and one or more of the passive valve hydraulic pumps 130B are activated to generate the corresponding flows 132B when the pressure indicated by the pressure signal 142 drops below a second pressure setpoint. Additionally, the pumps 130 are controlled to decrease the produced flows 132 of hydraulic fluid when the pressure at the main output rises above the first pressure setpoint, such as by deactivating one or more of the piston pumps 160 of the active valve hydraulic pumps 130A and adjusting the working volume 170 of the piston pumps 160 of the passive valve hydraulic pumps 130B using the working volume adjuster 178, for example.

The HPU controller 128, or another controller, may store a desired first pressure setpoint in its memory 204 and issue control signals 210 to the pump controllers 193 of the pumps 130A such that they operate as described above. The second pressure setpoint may be controlled manually (e.g., pressure control valve) or through signals issued by the HPU controller 128 or another controller of the system 100. In one example, each pump 130B may include one or more remote pressure control valves, each of which controls the second pressure setpoint in response to control signals 210 issued by the HPU controller 128 or another controller of the system 100.

In one embodiment, the first pressure setpoint is less than the second pressure setpoint. In one example, the first pressure setpoint is approximately 1-5% less than the second pressure setpoint, such as 2-3% less. As a result, while the pressure at the main output 133 is less than the second pressure setpoint but greater than the first pressure setpoint, one or more of the passive valve hydraulic pumps 130B attempt to substantially meet the demanded flow 212 by adjusting the working volume 170 of the piston pumps 160 using the working volume adjuster 178. In the event the pumps 130B are slow in reacting to a demand for increased flow, or are already operating at their maximum capacity, the pressure at the main output 133 will drop below the first pressure setpoint, thus triggering the activation of one or more of the piston pumps 160 of the active valve hydraulic pumps 130A and the production of the flows 132A. This results in a rapid increase in the main flow 106 (line 212) to meet the demanded flow 210. When the pressure at the main output 133 rises above the first pressure setpoint, the output flow 132A from the one or more pumps 130A is decreased as the pumps 130B can take over and produce the bulk of the flow 106 (line 212) through the main output 133.

Figure 9:
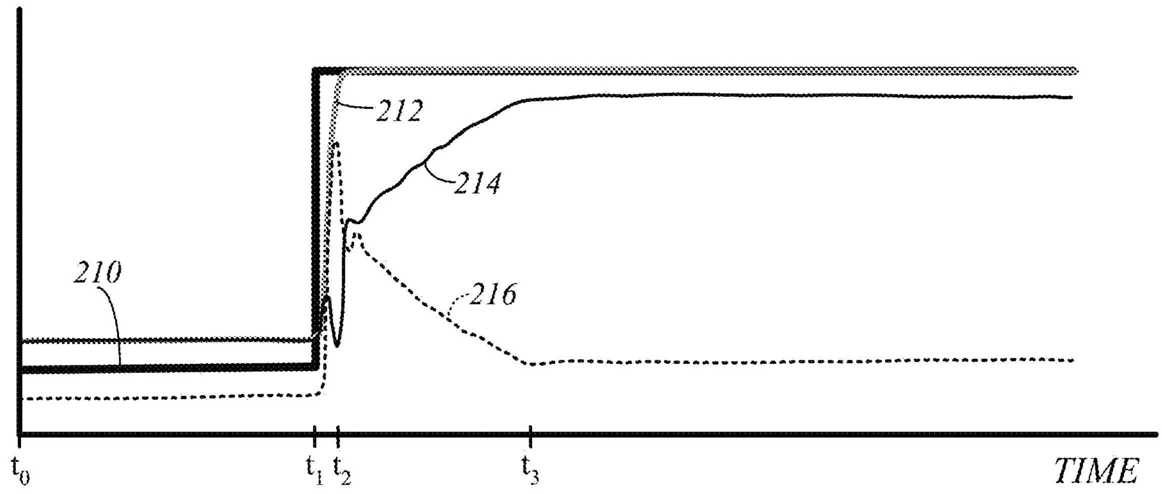
FIG. 9 is a chart illustrating an example operation of a hydraulic power unit, in accordance with embodiments of the present disclosure.

This process is illustrated in the chart of FIG. 9. Line 210 indicates the demand for the flow 106 of hydraulic fluid through the main output 133, such as by the test stations 102, the grey line 212 illustrates the main flow 106 of hydraulic fluid discharged through the main output 133 and produced by the flows 132A and 132B of the pumps 130A and 130B, the line 214 indicates the flows 132B of hydraulic fluid produced by the pumps 130B, and the dashed line 216 indicates the flows 132A of hydraulic fluid produced by the pumps 130A.

From time $t_0$ to $t_1$, the demand indicated by line 212 is continuous and steady and is less than the maximum capacity of the pumps 130B of the HPU 110. Accordingly, the HPU 110 provides the demanded flow 212 of hydraulic fluid at the main output 133 using the flows 132B produced by the pumps 130B. Here, the pressure at the main output 133 is stabilized at or around the second pressure setpoint. Since the pressure is above the first pressure setpoint, the pumps 130A are substantially or entirely deactivated and, thus, do not produce a significant flow 132A of hydraulic fluid.

At time $t_1$, a stark increase in the flow of hydraulic fluid is demanded, as indicated by line 210. Initially, the pressure at the main output 133 drops below the second pressure setpoint, thus triggering the pumps 130B to increase their output flows 132B of hydraulic fluid, such as by changing the working volume 170 of the piston pumps 160 using the working volume adjuster 178. However, since the pumps 130B are unable to quickly meet the demanded flow, the pressure at the main output 133 continues to drop and falls below the first pressure setpoint. This triggers the activation of one or more of the pumps 130A to quickly produce output flows 132A of hydraulic fluid that, when combined with the output flows 132B from the pumps 130B, produce a combined output flow 106 (line 212) at the main output 133 that matches the demanded flow 210.

From time $t_2$ to $t_3$, the increasing the hydraulic fluid flows 132B output from the pumps 130B provides a more significant contribution to the combined flow 106 (line 212), and the output flows 132A from the pumps 130A are decreased accordingly. During this period, the pressure at the main output 133 fluctuates around the first pressure setpoint.

After time $t_3$, the output flows 132B from the pumps 130B stabilize to produce the bulk of the demanded flow 106. In the illustrated example, the demanded flow is greater than the combination of the maximum output flows 132B of the pumps 130B. Thus, unlike the period from time $t_0$ to $t_1$ where the pumps 130B were capable of producing the demanded flow 210 thereby allowing the pumps 130A to be deactivated, the pumps 130A are used after time $t_3$ to produce some of the demanded flow 210 in response to the pressure at the main output 133 fluctuating around the first pressure setpoint.

In one embodiment, the first pressure setpoint is greater than the second pressure setpoint. In one example, the first pressure setpoint is approximately 1-5% greater than the second pressure setpoint, such as 2-3% greater. When pressure at the main output 133 is less than the first pressure setpoint but greater than the second pressure setpoint, one or more of the active valve hydraulic pumps 130A attempt to substantially meet the demanded flow 106 by activating one or more of the piston pumps 160. In the event the pumps 130A are unable to meet the demand for increased flow, or are already operating at their maximum capacity, the pressure at the main output 133 will drop below the second pressure setpoint, thus triggering the activation of one or more of the passive valve hydraulic pumps 130B and the production of the flows 132B. This results in an increase in the main flow 106. When the pressure at the main output 133 rises above the second pressure setpoint, the output flow 132B from the one or more pumps 130B is decreased as the pumps 130A take over and produce the bulk of the flow 106 through the main output 133.

Figure 10:
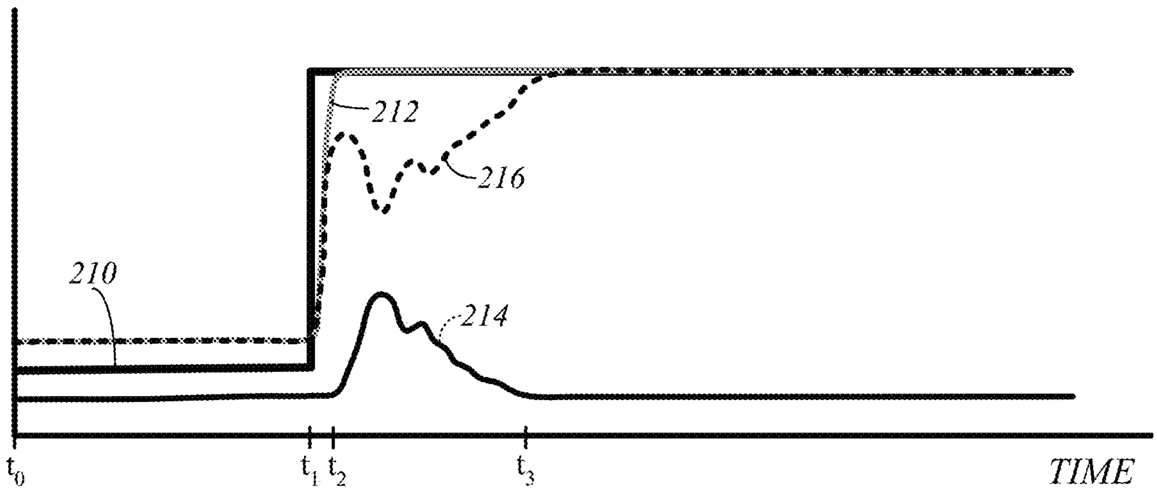
FIG. 10 is a chart illustrating an example operation of a hydraulic power unit, in accordance with embodiments of the present disclosure.

This process is illustrated in the chart of FIG. 10. Line 210 indicates the demand for the flow 106 of hydraulic fluid through the main output 133, such as by the test stations 102, the grey line 212 illustrates the main flow 106 of hydraulic fluid discharged through the main output 133 and produced by the flows 132A and 132B of the pumps 130A and 130B, the line 214 indicates the flows 132B of hydraulic fluid produced by the pumps 130B, and the dashed line 216 indicates the flows 132A of hydraulic fluid produced by the pumps 130A.

From time $t_0$ to $t_1$, the demand indicated by line 212 is continuous and steady and is less than the maximum capacity of the pumps 130A of the HPU 110. Accordingly, the HPU 110 provides the demanded flow 106 of hydraulic fluid at the main output 133 using the flows 132A produced by the pumps 130A. Here, the pressure at the main output 133 is stabilized at or around the first pressure setpoint. Since the pressure is above the second pressure setpoint, the pumps 130B are substantially or entirely deactivated and, thus, do not produce a significant flow 132B of hydraulic fluid.

At time $t_1$, a stark increase in the flow of hydraulic fluid is demanded, as indicated by line 210. Initially, the pressure at the main output 133 drops below the first pressure setpoint, thus triggering the pumps 130A to increase their output flows 132A of hydraulic fluid, such as by activating one or more of the piston pumps 160. However, in the event the pumps 130A are unable to quickly meet the demanded flow, the pressure at the main output 133 continues to drop and falls below the second pressure setpoint. This triggers the activation of one or more of the pumps 130B to produce increased output flows 132B of hydraulic fluid, such as by changing the working volume 170 of the piston pumps 160 using the working volume adjuster 178. When the output flows 132B are combined with the output flows 132A from the pumps 130A, a combined output flow 106 (line 212) is produced at the main output 133 that matches the demanded flow 210.

From time $t_2$ to $t_3$, the increasing the hydraulic fluid flows 132A output from the pumps 130A provides a more significant contribution to the combined flow 106 (line 212), and the output flows 132B from the pumps 130B are decreased accordingly. During this period, the pressure at the main output 133 fluctuates around the second pressure setpoint.

After time $t_3$, the output flows 132A from the pumps 130A stabilize to produce the bulk of the demanded flow 106 (line 210). In the illustrated example, the demanded flow is less than the combination of the maximum output flows 132A of the pumps 130A. Thus, the pumps 130A are primarily used after time $t_3$ to produce the demanded flow 106 (line 210) in response to the pressure at the main output 133 fluctuating around the second pressure setpoint.

In yet another embodiment, the first and second pressure setpoints are set to substantially the same pressure (e.g., +/−0.8%). Thus, the flows 132A and 132B from the active valve hydraulic pumps 130A and the passive valve hydraulic pumps 130B are produced as the pressure at the main output 133 fluctuates around the first and second pressure setpoints. When the demanded flow increases starkly causing a drop in the pressure at the main output 133, the flows 132A and 132B are increased to meet the demand, with the flows 132A generally increasing more rapidly than the flows 132B. Likewise, as the demanded flow decreases, the pressure at the main output 133 increases causing the pumps 130A and 132B to decrease their flows 132A and 132B until the pressure is stabilized around the first and second pressure setpoints.

Additional embodiments relate to methods of operating an HPU 110, such as using the HPU controller 128. The HPU 110 may be formed in accordance with the embodiments described herein. Thus, the HPU 110 may include, for example, the reservoir 136, the main output 133, the pressure sensor 140, at least one active valve hydraulic pump 130A configured to drive a first flow portion 132A of the main flow 106 through the main output 133 when the pressure of the main flow 106 indicated by the pressure signal 142 is below a first pressure setpoint, and at least one passive valve hydraulic pump 130B configured to drive a second flow portion 132B of the main flow 106 through the main output 133 when the pressure signal 142 indicates that the pressure is below a second pressure setpoint, as illustrated in FIG. 2.

Figure 11:
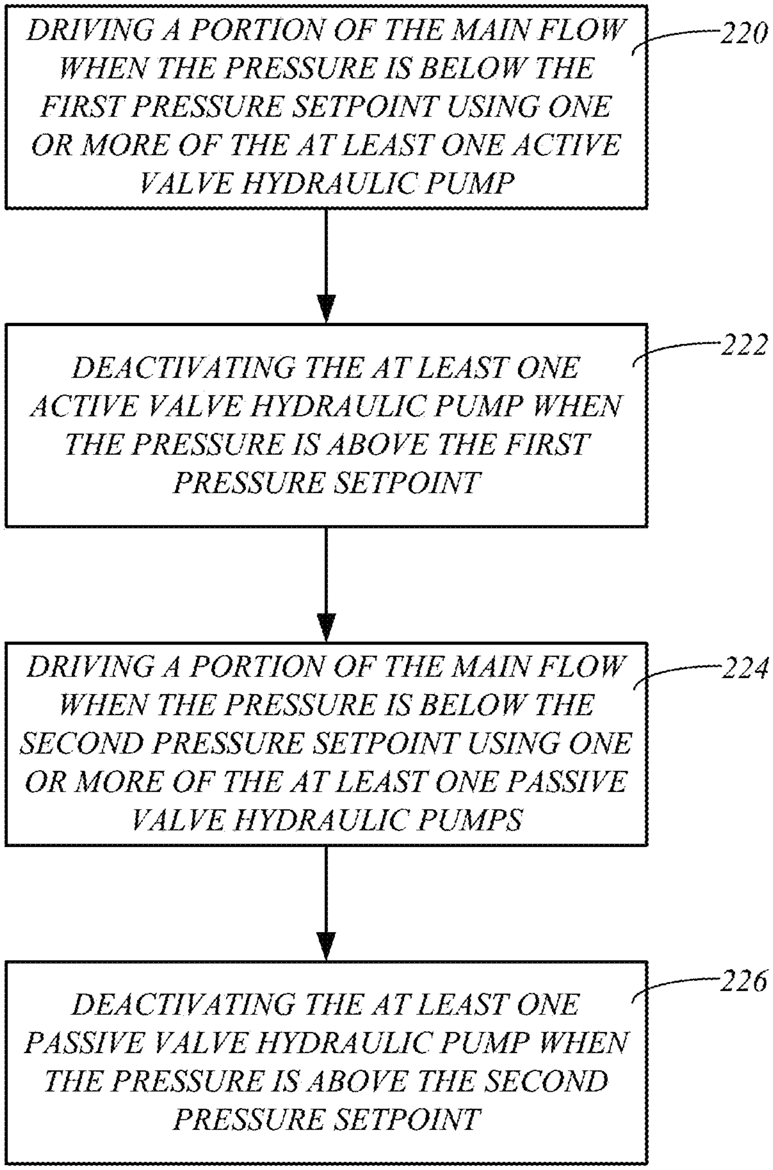
FIG. 11 is a flowchart illustrating an example of a method of operating a hydraulic power unit, in accordance with embodiments of the present disclosure.

FIG. 11 is a flowchart illustrating an example of a method of operating the HPU, in accordance with embodiments of the present disclosure. At 220 of the method, a portion of the main flow 106 is driven using one or more of the at least one active valve hydraulic pumps 130A when the pressure signal 142 indicates that the pressure at the main output 133 is below the first pressure setpoint. At 222, the at least one active valve hydraulic pump 130A is deactivated when the pressure signal 142 indicates that the pressure at the main output 133 is above the first pressure setpoint.

Similarly, at 224 of the method, a portion of the main flow 106 is driven using one or more of the at least one passive valve hydraulic pumps 130B when the pressure signal 142 indicates that the pressure at the main output 133 is below the second pressure setpoint. At 226, the at least one passive valve hydraulic pump 130B is deactivated when the pressure signal 142 indicates that the pressure at the main output 133 is above the second pressure setpoint.

When the second pressure setpoint is greater (e.g., 1-5%) than the first pressure setpoint, the HPU 110 is operated as described above with reference to the chart of FIG. 9. For example, one or more of the passive valve hydraulic pumps 130B are used in combination with the pumps 130A to drive the main flow 106 during step 220, and only one or more of the passive valve hydraulic pumps 130B are used to drive the main flow 106 when the pressure at the main output 133 is above the first pressure setpoint in step 224.

When the first pressure setpoint is greater (e.g., 1-5%) than the second pressure setpoint, the HPU 110 is operated as described above with reference to the chart of FIG. 10. For example, one or more of the active valve hydraulic pumps 130A are used in combination with the passive valve hydraulic pumps 130B to drive the main flow 106 during step 224, and only one or more of the active valve hydraulic pumps 130A are used to drive the main flow 106 when the pressure at the main output 133 is above the second pressure setpoint in step 224.

Figure 12:
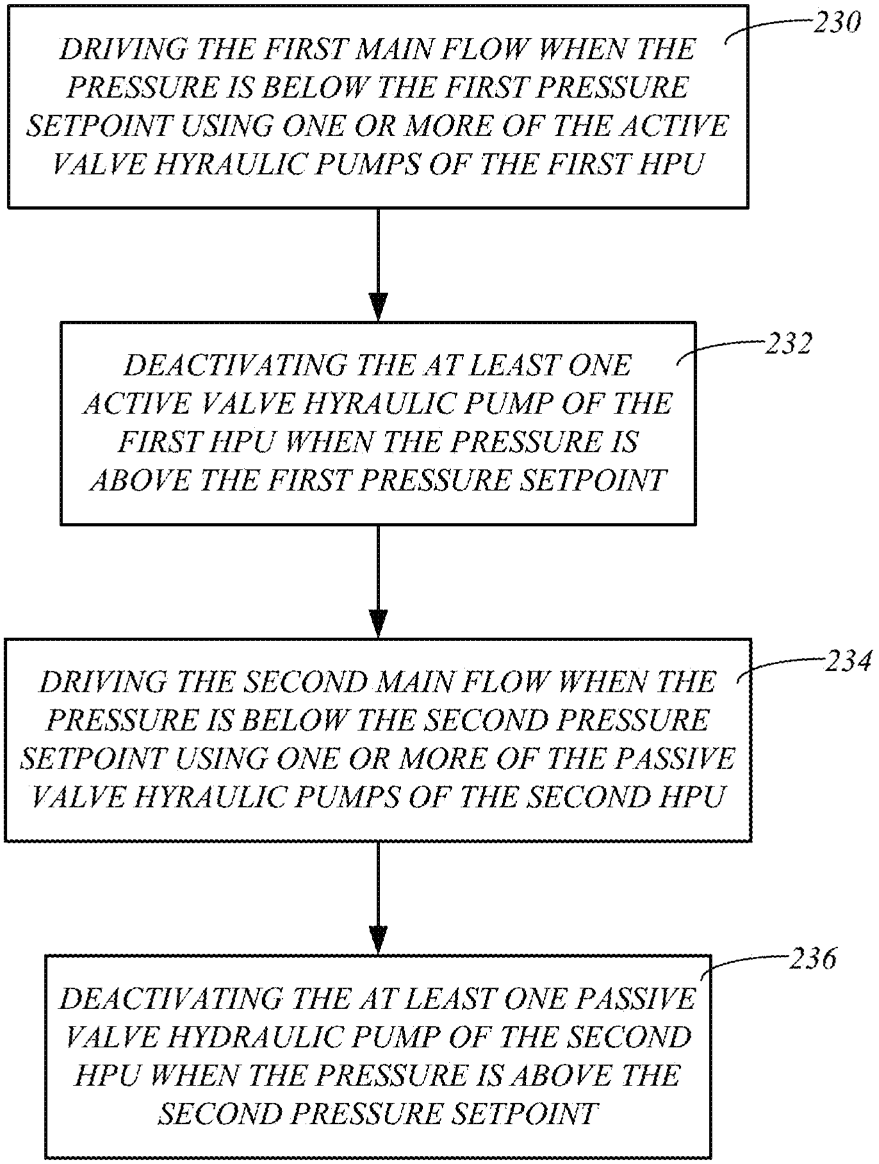
FIG. 12 is a flowchart illustrating an example of a method of operating a hydraulic power system, in accordance with embodiments of the present disclosure.

Embodiments of the present disclosure are also directed to methods of operating the HPS 114 (FIG. 3), which are similar to the methods of operating the HPU 110. FIG. 12 is a flowchart illustrating one example of a method of operating the HPS 114, in accordance with embodiments of the present disclosure, which may be implemented using the HPS controller 146, for example. The HPS 114 may be formed in accordance with the embodiments described herein. Thus, the HPS 114 may include, for example, a first HPU 110A comprising a reservoir 136, a main output 133, and at least one active valve hydraulic pump 130A configured to drive a flow portion 132A of a first main flow 106A through the main output 133 when a pressure indicated by a pressure signal 142 from a pressure sensor 140, is below a first pressure setpoint, and a second HPU 110B comprising a main output 133, and at least one passive valve hydraulic pump 130B configured to drive a flow portion 132B of a second main flow 106B through the main output 133 when a pressure indicated by a pressure signal 142 of a pressure sensor 140 is below a second pressure setpoint. Additionally, the HPS 114 may include a flow aggregator 148 that is configured to combine the first and second main flows 106A and 106B into a combined flow 150.

At 230 of the method, the first main flow 106A is driven using one or more of the at least one active valve hydraulic pump 130A of the first HPU 110A when the pressure at the main output 133 is below the first pressure setpoint. At 232, the at least one active valve hydraulic pump 130A of the HPU 110A is deactivated when the pressure at the main output 133 is above the first pressure setpoint. Similarly, at 234 of the method, the second main flow 106B is driven using one or more of the at least one passive valve hydraulic pump 130B of the second HPU 110B when the pressure at the main output 133 is below the second pressure setpoint. At 236, the at least one passive valve hydraulic pump 130B of the HPU 110B is deactivated when the pressure at the main output 133 is above the second pressure setpoint. In this manner, a demanded combined flow 150 may be provided using the HPU's 110A and 110B.

When the second pressure setpoint is greater (e.g., 1-5%) than the first pressure setpoint, one or more of the passive valve hydraulic pumps 130B of the HPU 110B are used in combination with the pumps 130A of the HPU 110A to produce the combined flow 150 during step 230, and only one or more of the passive valve hydraulic pumps 130B of the HPU 110B are used to produce the combined flow 150 when the pressure at the main output 133 is above the first pressure setpoint in step 236.

When the first pressure setpoint is greater (e.g., 1-5%) than the second pressure setpoint, one or more of the active valve hydraulic pumps 130A of the HPU 110A are used in combination with the passive valve hydraulic pumps 130B of the HPU 110B to produce the combined flow 150 during step 234, and only one or more of the active valve hydraulic pumps 130A of the HPU 110A are used to produce the combined flow 150 when the pressure at the main output 133 is above the second pressure setpoint in step 230.

Additional embodiments of the present disclosure relate to the use of two or more pressure sensors 140 by the HPU 110 to measure the pressure of the main flow 106 at the main output 133, as indicated in FIG. 2, and/or the use of two or more pressure sensors 140 by the HPS to measure the pressure of the combined main flow 150, such as the aggregator 148 or the main output 133 of one or both of the HPU's 110A and 110B, as indicated in FIG. 3. In one embodiment, the controller monitoring the pressure signals 142 from the pressure sensors 140, such as the HPU controller 128 or the HPS controller 146, compares the values associated with the signals 142 with a reference range of values corresponding to anticipated valid values, which may be stored in the memory 204 of the controller. If one of the signal values falls outside the reference range, it may be discarded and the other signal value that falls within the reference range may be used to facilitate the pump control functions described above. The controller may issue a notification to an operator or administrator of the system of an abnormal condition concerning one of the pressure sensors using the circuitry 206.

If both of the signal values fall outside the reference range, this may indicate a severe abnormal condition (e.g., power loss, fluid leak, etc.) and the controller may issue a notification to an operator or administrator of the system indicating the abnormal condition.

In one embodiment, the controller compares the signal values to each other. When the signal values substantially match (e.g., +/−10%), it is assumed that the sensors 140 of the HPU 110 or HPS 114 are operating properly. If the signal values do not substantially match, the controller may issue a notification to an operator or administrator of the system indicating an abnormal condition in the form of an issue with one of the pressure sensors 140, a loss of sensor signal, or another abnormal condition indicated by the mismatching pressure signals 142.

The notification issued by the controller may take any suitable form and may be represented by the data 212 in FIG. 8. Examples of the notification include an audible and/or visible alarm, and/or an electronic message (control panel message, email, text message, etc.) to an operator or administrator of the system.

As an option, the embodiments described above may be modified through the use of one or more flow rate sensors in place of each of the one or more pressure sensors 140. Each flow rate sensor produces a flow rate signal that is indicative of the flow rate of the sensed fluid flow and may be used in a similar manner as the pressure indicated by the pressure signal 142 from one of the pressure sensors 140 to control the pumps 130. Accordingly, each of the one or more pressure sensors 140 illustrated in the drawings may represent a corresponding flow rate sensor, and each of the illustrated pressure signals 142 may represent a flow rate signal.

Thus, the method of FIG. 11 may be modified to utilize a sensed flow rate rather than a sensed pressure to control the pumps. For example, step 220 of the method of FIG. 11 is adjusted such that the portion of the main flow is driven when the flow rate indicated by a corresponding flow rate sensor is below a first flow rate setpoint using one or more of the at least one active valve hydraulic pumps. At 222, the at least one active valve hydraulic pump is deactivated when the flow rate is above the first flow rate setpoint. At 224, a portion of the main flow is driven when the flow rate is below a second flow rate setpoint using one or more of the at least one passive hydraulic pumps. At 226, the at least one passive hydraulic pumps is deactivated when the flow rate is above the second flow rate setpoint.

Although the embodiments of the present disclosure have been described with reference to preferred embodiments, workers skilled in the art will recognize that changes may be made in form and detail without departing from the spirit and scope of the present disclosure.

What is claimed is:

1. A hydraulic power unit comprising:

a reservoir containing hydraulic fluid;

a main output through which a main flow of the hydraulic fluid is discharged;

a pressure sensor having a pressure signal that is indicative of a pressure of the main flow;

at least one active valve hydraulic pump having variable displacement, each configured to drive a first flow portion of the main flow from the reservoir to the main output when the pressure signal is below a first pressure setpoint;

at least one passive valve hydraulic pump having variable displacement, each configured to drive a second flow portion of the main flow from the reservoir to the main output when the pressure signal is below a second pressure setpoint; and a housing containing the reservoir, the at least one active valve hydraulic pump and the at least one passive valve hydraulic pump.

2. The hydraulic power unit of claim 1, wherein:

the first pressure setpoint is less than the second pressure setpoint; or the first pressure setpoint is greater than the second pressure setpoint.

3. The hydraulic power unit according to claim 2, wherein the first pressure setpoint is about 1-5% less than the second pressure setpoint.

4. The hydraulic power unit according to claim 2, wherein the first pressure setpoint is about 1-5% greater than the second pressure setpoint.

5. The hydraulic power unit of claim 1, wherein the first pressure setpoint is equal to the second pressure setpoint.

6. The hydraulic power unit according to claim 1, further comprising at least one controller configured to set the first and second pressure setpoints.

7. The hydraulic power unit according to claim 1, wherein the at least one passive valve hydraulic pump comprises a plurality of the passive valve hydraulic pumps.

8. The hydraulic power unit according to claim 7, wherein the at least one active valve hydraulic pump comprises a plurality of the active valve hydraulic pumps.

9. The hydraulic power unit according to claim 1, wherein the at least one active valve hydraulic pump comprises a plurality of the active valve hydraulic pumps.

10. The hydraulic power unit according to claim 1, wherein each active valve hydraulic pump comprises:

a low pressure port connected to the fluid reservoir;

a high pressure port connected to the main output;

a plurality of piston pumps;

a motor configured to drive a cyclical change to a working volume of each piston pump;

a plurality of active valves, each corresponding to one of the piston pumps and configured to set the piston pump in an activated state, in which the cyclical change to the working volume drives the first flow portion of hydraulic fluid from the working volume through the high pressure port, and a deactivated state, in which a fluid pathway is formed between the working volume and the reservoir or the low pressure port; and a pump controller configured to control each of the active valves to individually set the piston pumps in the activated or the deactivated state.

11. The hydraulic power unit according to claim 10, wherein each passive valve hydraulic pump comprises:

a low pressure port connected to the fluid reservoir;

a high pressure port connected to the main output;

a plurality of piston pumps, each configured to draw hydraulic fluid through the low pressure port into an adjustable working volume, and drive the second flow portion of hydraulic fluid from the adjustable working volume through the high pressure port; and a motor configured to drive a cyclical change to the adjustable working volume of each piston pump.

12. A method of operating a hydraulic power unit, which includes:

a reservoir containing hydraulic fluid;

a main output through which a main flow of the hydraulic fluid from the reservoir is discharged;

a pressure sensor having a pressure signal that is indicative of a pressure of the main flow;

at least one active valve hydraulic pump having variable displacement;

at least one passive valve hydraulic pump having variable displacement; and a housing containing the reservoir, the at least one active valve hydraulic pump and the at least one passive valve hydraulic pump, the method comprising:

driving a first flow portion of the main flow when the pressure signal indicates that the pressure of the main flow is below a first pressure setpoint using one or more of the at least one active valve hydraulic pump;

deactivating the at least one active valve hydraulic pump when the pressure signal indicates that the pressure of the main flow is above the first pressure setpoint;

driving a second flow portion of the main flow when the pressure signal indicates that the pressure of the main flow is below a second pressure setpoint using one or more of the at least one passive hydraulic pump; and deactivating the at least one passive valve hydraulic pump when the pressure signal indicates that the pressure of the main flow is above the second pressure setpoint.

13. The method according to claim 12, wherein:

the first pressure setpoint is less than the second pressure setpoint; or the first pressure setpoint is greater than the second pressure setpoint.

14. The method according to according to claim 13, wherein the first pressure setpoint is about 1-5% less than the second pressure setpoint.

15. The method according to claim 13, wherein the first pressure setpoint is about 1-5% greater than the second pressure setpoint.

16. The method according to claim 12, wherein the first pressure setpoint is equal to the second pressure setpoint.

17. The method according to claim 12, wherein the at least one passive valve hydraulic pump comprises a plurality of the passive valve hydraulic pumps.

18. The method according to claim 12, wherein the at least one active valve hydraulic pump comprises a plurality of the active valve hydraulic pumps.

19. The method according to claim 12, wherein:
each active valve hydraulic pump comprises:
a low pressure port connected to the fluid reservoir;
a high pressure port connected to the main output;
a plurality of first piston pumps;
a motor configured to drive a cyclical change to a working volume of each first piston pump;
a plurality of active valves, each configured to set one of the first piston pumps in an activated state, in which the cyclical change to the working volume drives a portion of the first flow portion through the high pressure port, and a deactivated state, in which a fluid pathway is formed between the working volume and the reservoir or the low pressure port; and
a pump controller configured to control each of the active valves to individually set the first piston pumps in the activated or the deactivated state; and
each passive valve hydraulic pump comprises:
a low pressure port connected to the fluid reservoir;
a high pressure port connected to the main output;
a plurality of second piston pumps, each configured to draw hydraulic fluid through the low pressure port into an adjustable working volume, and drive a portion of the second flow portion of hydraulic fluid from the adjustable working volume through the high pressure port; and
a motor configured to drive a cyclical change to the adjustable working volume of each of the second piston pumps.

20. A hydraulic power system comprising:
at least one first hydraulic power unit, each comprising:
a first reservoir containing hydraulic fluid;
a first main output through which a first main flow of the hydraulic fluid is discharged;
a first pressure sensor having a first pressure signal that is indicative of a first pressure of the first main flow;
at least one active valve hydraulic pump, each configured to drive a flow portion of the first main flow from the first reservoir to the first main output when the first pressure signal indicates that the first pressure is below a first pressure setpoint; and
a first housing containing the first reservoir and the at least one active valve hydraulic pump;
at least one second hydraulic power unit, each comprising:
a second reservoir containing hydraulic fluid;
a second main output through which a second main flow of the hydraulic fluid is discharged;
a second pressure sensor having a second pressure signal that is indicative of a second pressure of the second main flow;
at least one passive valve hydraulic pump, each configured to drive a flow portion of the second main flow from the second reservoir to the second main output when the second pressure signal indicates that the second pressure is below a second pressure setpoint; and
a second housing containing the second reservoir and the at least one passive valve hydraulic pump; and
a flow aggregator configured to combine the first and second main flows into a combined main flow.

* * * * *